United States Patent
Kudo

(10) Patent No.: US 9,052,811 B2
(45) Date of Patent: Jun. 9, 2015

(54) INFORMATION PROCESSING APPARATUS FOR ASSOCIATING ELECTRONIC INFORMATION DISPLAYED ON A SCREEN

(71) Applicant: FUJI XEROX CO., LTD., Minato-ku, Tokyo (JP)

(72) Inventor: Yoji Kudo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 250 days.

(21) Appl. No.: 13/651,913

(22) Filed: Oct. 15, 2012

(65) Prior Publication Data

US 2013/0246957 A1 Sep. 19, 2013

(30) Foreign Application Priority Data

Mar. 19, 2012 (JP) ................................. 2012-061432

(51) Int. Cl.
*G06F 3/00* (2006.01)
*G06F 3/0486* (2013.01)
*G06F 3/0483* (2013.01)

(52) U.S. Cl.
CPC ............ *G06F 3/0486* (2013.01); *G06F 3/0483* (2013.01)

(58) Field of Classification Search
CPC ............................... G06F 17/30; G06F 3/0486
USPC ......................................................... 715/769
See application file for complete search history.

(56) References Cited

U.S. PATENT DOCUMENTS

| | | | | |
|---|---|---|---|---|
| 8,234,581 | B2 * | 7/2012 | Kake | 715/764 |
| 8,495,099 | B2 * | 7/2013 | Maim | 707/794 |
| 2007/0157097 | A1 * | 7/2007 | Peters | 715/764 |
| 2008/0077874 | A1 * | 3/2008 | Garbow et al. | 715/764 |
| 2008/0235610 | A1 * | 9/2008 | Dettinger et al. | 715/769 |
| 2008/0270926 | A1 * | 10/2008 | Dettinger et al. | 715/769 |
| 2009/0112881 | A1 | 4/2009 | Kodama | |
| 2009/0276701 | A1 * | 11/2009 | Nurmi | 715/702 |

FOREIGN PATENT DOCUMENTS

| | | |
|---|---|---|
| JP | 2003-345487 A | 12/2003 |
| JP | 2007-148687 A | 6/2007 |
| JP | 2007-148688 A | 6/2007 |
| JP | 2009-110260 A | 5/2009 |
| JP | 2010-049461 A | 3/2010 |

* cited by examiner

*Primary Examiner* — Tadeese Hailu
*Assistant Examiner* — Andrew Chung
(74) *Attorney, Agent, or Firm* — Sughrue Mion, PLLC

(57) ABSTRACT

An information processing apparatus includes a reception unit that receives an operation of an operator; a detection unit that detects a moving operation related to movement of electronic information; a first collection unit that collects positions of a source, a destination, and a trajectory during movement and first and second electronic information; a second collection unit that collects third electronic information; a first calculation unit that calculates a degree of association between the first and second electronic information and a degree of association between the first and third electronic information; a memory that stores the first and second electronic information or the first and third electronic information; a second calculation unit that calculates a degree of association between fourth electronic information and the first electronic information; and a presentation unit that presents the second or third electronic information, as a destination of the fourth electronic information, in a different form.

13 Claims, 15 Drawing Sheets

FIG. 3

| OBJECT ID | ARRANGMENT POSITION | SIZE | THUMBNAIL IMAGE | VIEW |
|---|---|---|---|---|
| | | | | |

FIG. 4

| | | |
|---|---|---|
| 410 | HISTORY ID | 1 |
| 412 | OPERATION DATE AND TIME | yyyy. mm. dd. hh. mm. ss |
| 414 | OBJECT ID | A. xdw |
| 416 | MOVE/COPY TYPE | MOVEMENT |
| 418 | SOURCE POSITION | (xs, ys) |
| 420 | DESTINATION POSITION | (xe, ye) |
| 422 | DESTINATION OBJECT ID | 111 |
| 424 | DESTINATION OBJECT NAME | Folder F |
| 426 | TRAJECTORY DETECTION NUMBER | n |
| 427 | TRAJECTORY POSITION 1 | (x1, y1) |
| | ... | ... |
| 42n | TRAJECTORY POSITION n | (xn, yn) |

| OBJECT ID | HISTORY ID | OBJECT NAME | VIEW | POSITION | PASS OBJECT ID | PASS OBJECT NAME |
|---|---|---|---|---|---|---|
| 1 | 1 | B.xdw | THUMBNAIL | (xo1, yo1) | 2 | FolderC |
| 2 | 1 | FolderC | TREE | (xo2, yo2) | 5 | FolderD |

FIG. 6

| OBJECT ID | RELATED OBJECT ID | DEGREE OF ASSOCIATION |
|---|---|---|
| 1 | 2 | 100 |
| 1 | 3 | 35 |
| 2 | 5 | 150 |

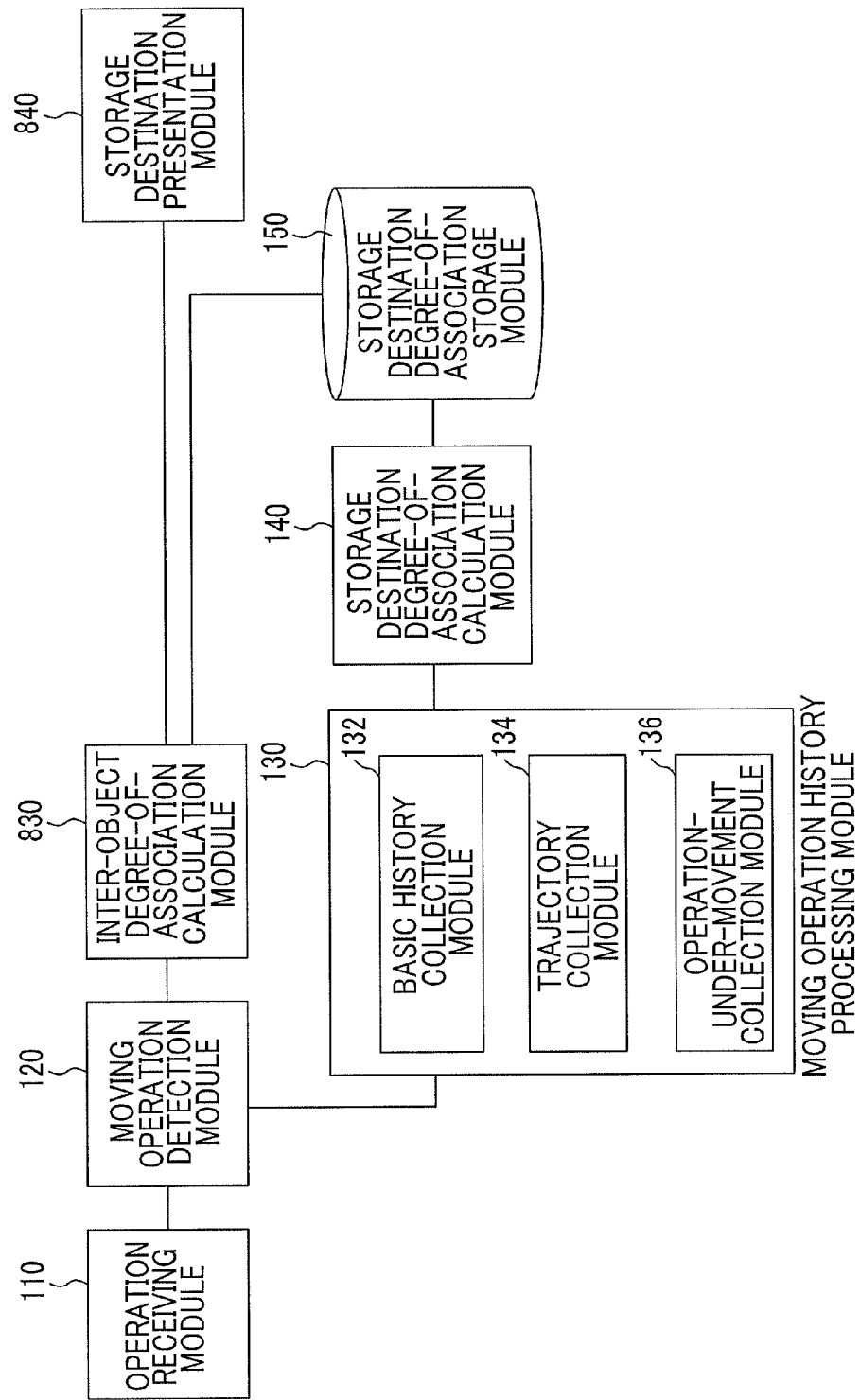

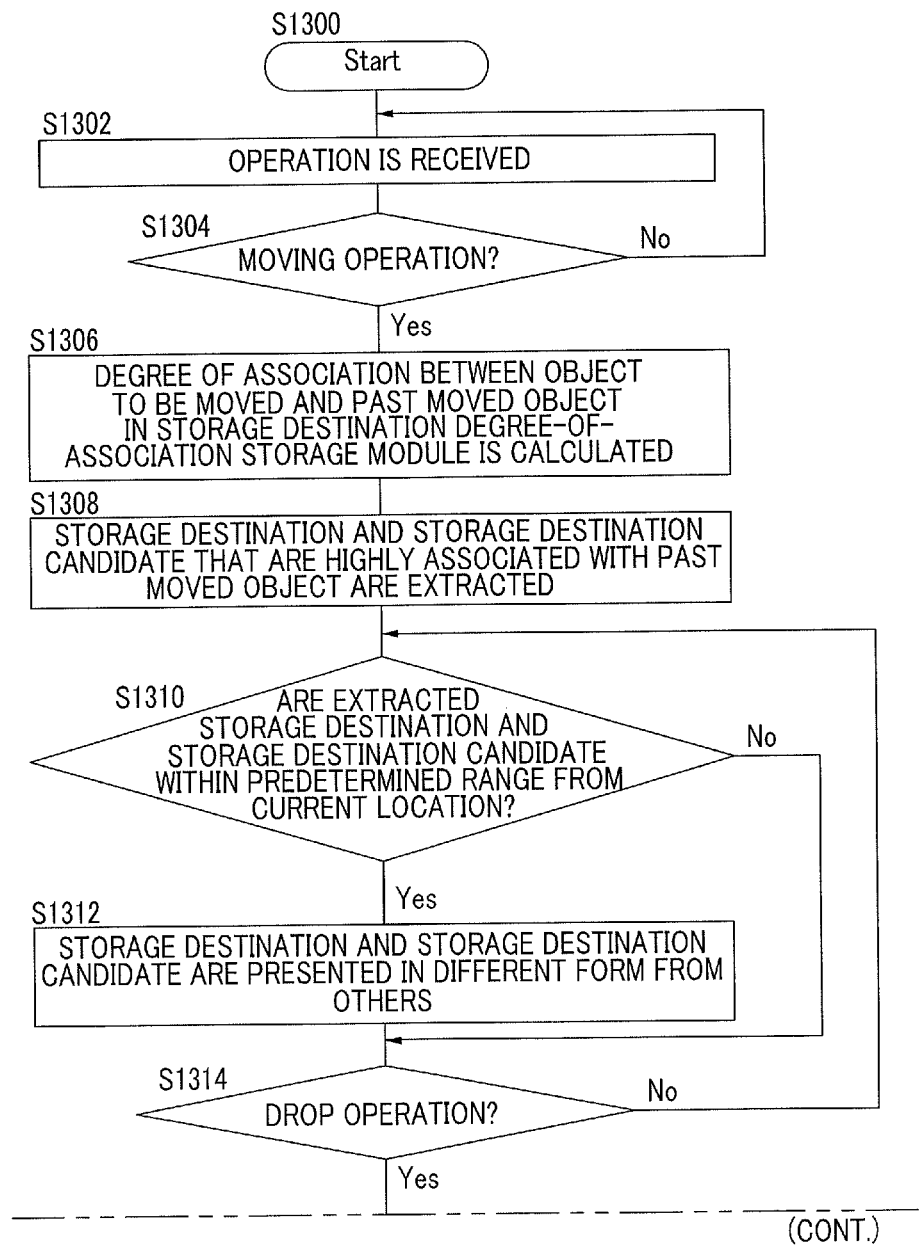

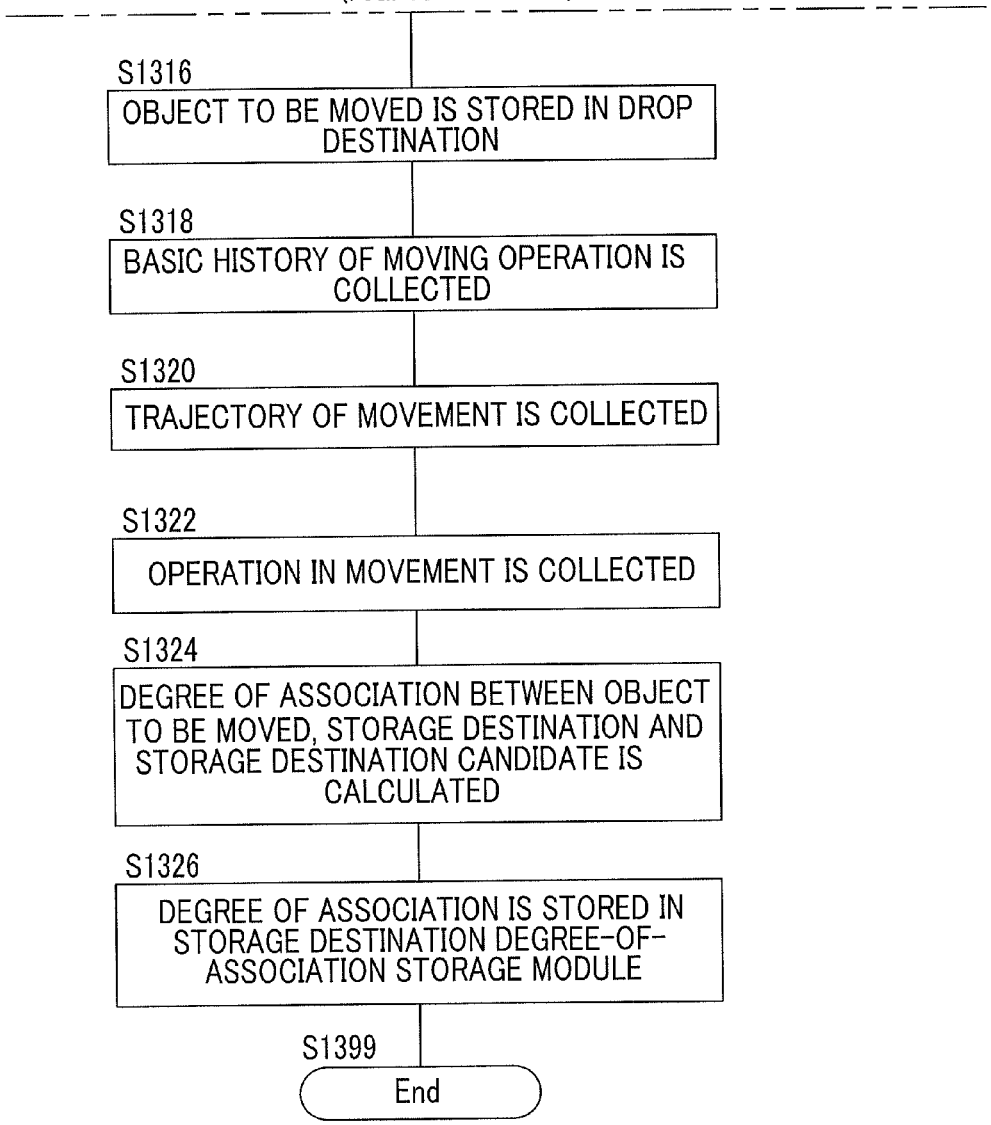

INFORMATION PROCESSING APPARATUS FOR ASSOCIATING ELECTRONIC INFORMATION DISPLAYED ON A SCREEN

CROSS-REFERENCE TO RELATED APPLICATIONS

This application is based on and claims priority under 35 USC 119 from Japanese Patent Application No. 2012-061432 filed Mar. 19, 2012.

BACKGROUND

Technical Field

The present invention relates to an information processing apparatus, a non-transitory computer readable medium storing an information processing program, and an information processing method.

SUMMARY

According to an aspect of the invention, there is provided an information processing apparatus including: a reception unit that receives an operation of an operator for electronic information disposed on a screen; a detection unit that detects a moving operation related to movement of electronic information from the operation received by the reception unit; a first collection unit that collects a position of a source, a position of a destination, a position of a trajectory during movement, first electronic information that is electronic information to be moved, and second electronic information that is electronic information of the destination, on the basis of the moving operation detected by the detection unit; a second collection unit that collects third electronic information, which is electronic information that the first electronic information has passed through, on the basis of the position of the trajectory during movement collected by the first collection unit; a first calculation unit that calculates a degree of association between the first electronic information and the second electronic information and a degree of association between the first electronic information and the third electronic information on the basis of the information collected by the first and second collection units; a memory that stores the first electronic information and the second electronic information associated with each other or the first electronic information and the third electronic information associated with each other on the basis of the degree of association calculated by the first calculation unit; a second calculation unit that calculates a degree of association between fourth electronic information, which is electronic information to be moved, and the first electronic information, which is stored in the memory, from the operation detected by the detection unit; and a presentation unit that presents the second electronic information or the third electronic information in which the first electronic information is stored, as a destination of the fourth electronic information, in a different form from other electronic information disposed on the screen on the basis of the degree of association between the first electronic information and the fourth electronic information calculated by the second calculation unit.

BRIEF DESCRIPTION OF THE DRAWINGS

Exemplary embodiments of the present invention will be described in detail based on the following figures, wherein:

FIG. 3 is an explanatory view showing an example of the data structure of an object arrangement table;

FIG. 4 is an explanatory view showing an example of the data structure of a history table;

FIG. 5 is an explanatory view showing an example of the data structure of a related objects table;

FIG. 6 is an explanatory view showing an example of the data structure of a storage destination degree-of-association table;

FIG. 12 is a view showing the conceptual module configuration in a configuration example of a second exemplary embodiment;

FIG. 13 is a flow chart showing an example of the process in the configuration example of the second exemplary embodiment.

DETAILED DESCRIPTION

Hereinafter, examples of various exemplary embodiments suitable for realizing the invention will be described with reference to the accompanying drawings.

Figure 1:
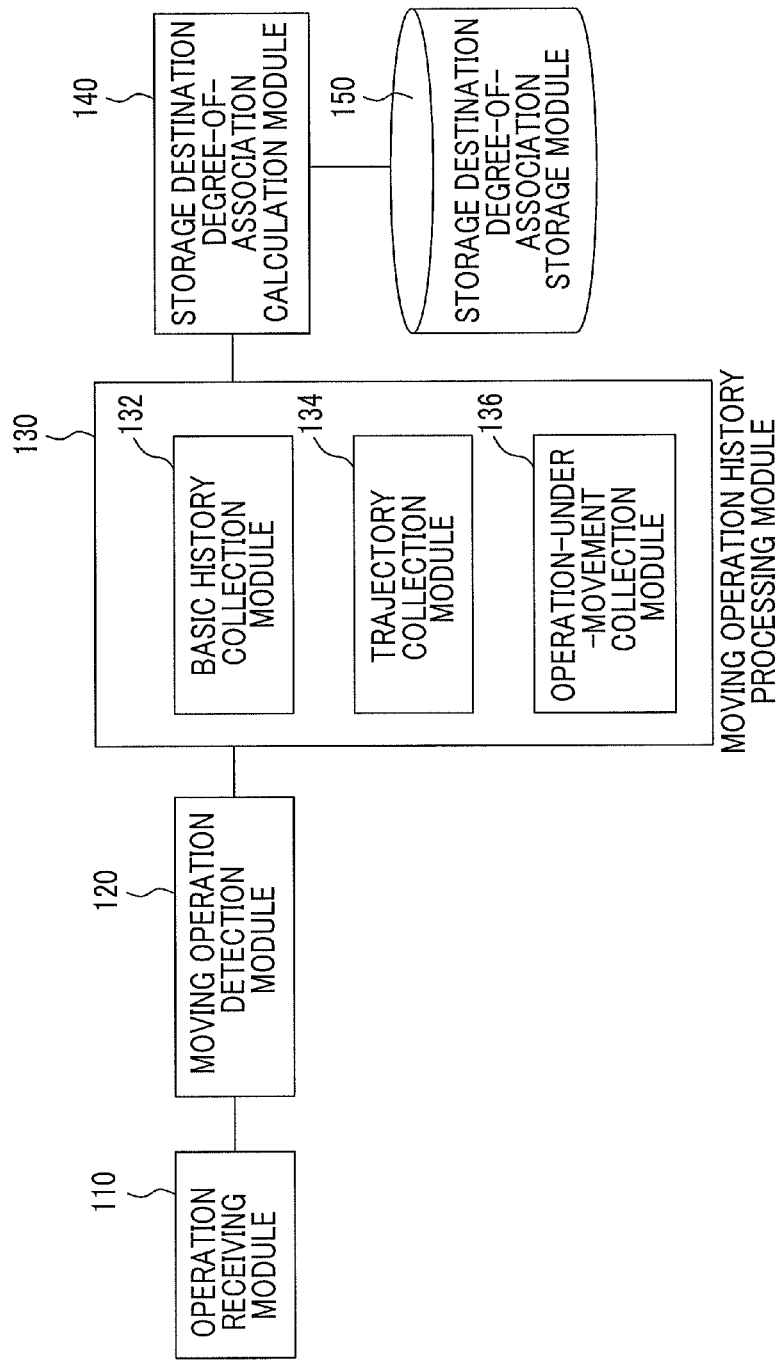
FIG. 1 is a view showing the conceptual module configuration in a configuration example (history collection) of a first exemplary embodiment.

FIG. 1 is a view showing the conceptual module configuration in a configuration example (history collection) of a first exemplary embodiment.

In addition, modules generally refer to logically separable components, such as software (computer program) and hardware. Therefore, the module in the present exemplary embodiment indicates not only a module in a computer program but also a module in the hardware configuration. Therefore, in the present exemplary embodiment, explanations of a computer program for making a computer function as these modules (a program for making a computer execute each procedure, a program for making a computer function as each unit, and a program for making a computer realize each function), a system, and a method are also made. In addition, "store", "cause to be stored", and words equivalent thereto are used for the convenience of explanation, and these words mean being stored in a storage device or making a control to be stored in a storage device when the exemplary embodiment is a computer program. In addition, a module corresponds to a function in a one-to-one manner. However, one module may be realized using one program or plural modules may be realized using one program. Alternatively, one module may be realized using plural programs. In addition, plural modules may be executed by one computer, or one module may be executed by plural computers in a distribution or parallel environment. In addition, other modules may be included in one module. In addition, 'connection' referred hereinafter is used not only for physical connections but also for logical connections (for example, transmission and reception of data, instruction, and reference relationships between data). "Set in advance" refers to being set before target processing and is used as meaning not only being set before processing of the present exemplary embodiment starts but also being set after processing of the present exemplary embodiment starts according to the situation and state at that time or according to the situation and state until then as long as it is before target processing. When there are plural "values set in advance", the values set in advance may be different values, or two or more values may be the same (undoubtedly, all values may be the same). In addition, description of "in the case of A, B is set" means that "determination regarding A is made, and B is set when determination as A is made". Here, a case where determination regarding A is not necessary is excluded.

In addition, a system or an apparatus may be realized by connecting plural computers, hardware, apparatuses, and the like to one another through a communication unit, such as a network (including communication connections of one-to-one correspondence), or may be realized using one computer, hardware, and an apparatus. The 'apparatus' and the 'system' are used as synonymous terms. Undoubtedly, a social "structure" (social system) which is an artificial agreement is not included in the "system".

In addition, for each processing of each module or for multiple processes when the multiple processes are performed in a module, target information is read from a storage device and the processing is performed and then the processing result is written into the storage device. Accordingly, explanations regarding the reading from a storage device before processing and writing into the storage device after processing may be omitted. In addition, examples of the storage device herein may include a hard disk, a Random Access Memory (RAM), an external storage device, a storage device using a communication line, and a register in a Central Processing Unit (CPU).

An information processing apparatus which is a configuration example (history collection) of the first exemplary embodiment classifies electronic information according to the movement of the electronic information. As shown in an example of FIG. 1, the information processing apparatus includes an operation receiving module 110, a moving operation detection module 120, a moving operation history processing module 130, a storage destination degree-of-association calculation module 140, and a storage destination degree-of-association storage module 150.

The operation receiving module 110 is connected to the moving operation detection module 120. The operation receiving module 110 receives an operation of the operator for the electronic information disposed on the screen.

Examples of the screen herein include a liquid crystal display, a CRT, and the like. In addition, examples of the operation include an operation using a mouse, a keyboard, or the like, and an operation of the finger on a touch panel or the like. Examples of the electronic information (hereinafter, referred to as an "object") include an electronic document, a folder capable of storing the electronic document, a drawer, a cabinet, and the like. Examples of the electronic document (hereinafter, referred to as a document) include text data or include electronic data, such as graphics, images, video, and audio, and a combination thereof in some cases. The electronic document is an object to be stored, edited, searched for, and the like, and is exchangeable as an individual unit between systems or users. Similar things to these are also included in examples of the electronic document. For the screen on which an electronic document is disposed, the screen is likened to the desk (desktop metaphor), and a document and the like are disposed on the screen. Generally, the screen is called a desktop, and there are a screen provided as an OS and a screen provided as an application. In addition, a document is selected by operation of an operator, and the document is operated on the screen. Examples of the operation include moving, editing, viewing (opening), and the like. In addition, in the following explanation, a document will mainly be illustrated as electronic information to be moved (electronic information located in a source) and a folder will mainly be illustrated as electronic information at a destination.

In addition, on this screen, when a document is newly created, the document is disposed on the basis of the rules set in advance as long as there is no operation of the operator. Examples of the rules set in advance include disposing documents from left to right and from top to bottom of the screen in order of creation.

The arrangement of documents on the screen is managed, for example, by an object arrangement table 300. FIG. 3 is an explanatory view showing an example of the data structure of the object arrangement table 300. The object arrangement table 300 has an object ID column 310, an arrangement position column 320, a size column 330, a thumbnail image column 340, and a view column 350. The object ID column 310 stores electronic information identification information (hereinafter, referred to as an object IDentification (ID)) which is information for identifying the document uniquely in the present exemplary embodiment. The arrangement position column 320 stores a position at which the electronic information is disposed. For example, the position may be the coordinates on the screen, or may be the coordinates in a virtual region (for example, desktop in the above-described desktop metaphor). In addition, the coordinates may be the upper left coordinates, the center coordinates, or the like of the displayed electronic information. The size column 330 stores the size of an image indicating the electronic information (also referred to as an icon). The thumbnail image column 340 stores a thumbnail image displayed on the screen as the electronic information. For example, when the electronic information is a folder, the electronic information may be an icon indicating the folder. The thumbnail image will be described later. In addition, a thumbnail image itself may be stored, or the location (file name, URL: Uniform Resource Locator, or the like) of a file of a thumbnail image may be stored. The view column 350 stores information indicating a region where the electronic information is disposed. Examples of the region include a "thumbnail display region" and a "folder tree display region". As a specific example, a thumbnail region 790 shown in FIG. 7 corresponds to the "thumbnail display region", and a tree region 780 shown in FIG. 7 corresponds to the "folder tree display region".

A trajectory collection module 134 collects information using the object arrangement table 300. For example, a passing document may be extracted by determining whether or not the passing document has passed through a region where the trajectory of movement is shown by the arrangement position column 320 and the size column 330.

The moving operation detection module 120 is connected to the operation receiving module 110 and the moving operation history processing module 130. The moving operation detection module 120 detects an operation on the movement of the electronic information from the operation received by the operation receiving module 110. This is an operation generally called drag and drop. In addition, there are two kinds of movements. One movement is the process of deleting a target document from the source and moving the document to the destination. Another movement is the process of copying a document to the destination without deleting the document from the source. In the present exemplary embodiment, simply referring to "movement" may be both the above cases. When both the cases are distinguished, the former movement is called movement A and the latter movement is called movement B or copy.

The moving operation history processing module 130 is connected to the moving operation detection module 120 and the storage destination degree-of-association calculation module 140. The moving operation history processing module 130 includes a basic history collection module 132, the trajectory collection module 134, and an operation-under-movement collection module 136.

The basic history collection module 132 collects the position of a source, the position of a destination, the position of the trajectory during movement, first electronic information that is electronic information to be moved, and second electronic information which is the electronic information of the destination on the basis of the movement operation detected by the moving operation detection module 120. For example, a document which is an object to be moved corresponds to the first electronic information, and a folder which is a destination of the document (which stores the document) corresponds to the second electronic information. Although the destination stores a document and the like as is called a folder, a drawer, cabinet, or the like, the destination may be a document. When a storage destination is a document, this is the process of adding (binding) a document to be moved after the end of the document at the storage destination. In the following explanation, a folder will mainly be illustrated as the storage destination and a document will mainly be illustrated as an object to be moved. In addition, the basic history collection module 132 may collect the date and time (year, month, day, hour, minute, second, and the like, or may be a combination thereof) of the operation on the movement.

As a specific example, the basic history collection module 132 creates a history table 400. FIG. 4 is an explanatory view showing an example of the data structure of the history table 400. The history table 400 has a history ID column 410, an operation date and time column 412, an object ID column 414, a move/copy type column 416, a source position column 418, a destination position column 420, a destination object ID column 422, a destination object name column 424, a trajectory detection number column 426, a trajectory position 1 column 427, and a trajectory position n column 42n. The history ID column 410 stores history identification information (hereinafter, referred to as a history ID) which is the information allowing the history of a moving operation to be uniquely identified in the present exemplary embodiment. The operation date and time column 412 stores the date and time when a moving operation corresponding to the history ID has been performed. The object ID column 414 stores an object ID (for example, a document ID) of an object (for example, a document) for which a moving operation is to be performed. The move/copy type column 416 stores information indicating whether the moving operation is movement A or movement B (copy). The source position column 418 stores the coordinates of a source. The destination position column 420 stores the coordinates of a destination. The destination object ID column 422 stores an object ID of an object which is a destination of the object. That is, this is an object ID of an object present at the position stored in the destination position column 420. The destination object name column 424 stores the name of a destination object. The trajectory detection number column 426 stores the number of coordinates detected in the trajectory of movement. For example, the moving operation detection module 120 may detect the coordinates at intervals set in advance. In addition, columns of the trajectory position 1 column 427 to the trajectory position n column 42n continue after the trajectory detection number column 426 by the number of detected coordinates. The trajectory position 1 column 427 stores the coordinates (first coordinates) of the trajectory. The trajectory position n column 42n stores the coordinates (n-th coordinates) of the trajectory.

The trajectory collection module 134 collects the third electronic information, which is electronic information that the first electronic information has passed through, on the basis of the position of the trajectory during movement collected by the basic history collection module 132. For example, a folder in which the operator hesitates to store the first electronic information until the operator moves the first electronic information to the second electronic information corresponds to the third electronic information. As specific processing, it is determined whether or not the coordinates (coordinates in the trajectory position 1 column 427 to the trajectory position n column 42n of the history table 400) of the trajectory during movement collected by the basic history collection module 132 are present in a region where the object calculated from the arrangement position column 320 and the size column 330 of the object arrangement table 300 is displayed. When the coordinates are present in the region, it is determined to be the third electronic information, and information regarding the third electronic information is collected. Then, the trajectory collection module 134 creates a related objects table 500. FIG. 5 is an explanatory view showing an example of the data structure of the related objects table 500. The related objects table 500 has an object ID column 510, a history ID column 520, an object name column 530, a view column 540, a position column 550, a passing object ID column 560, and a passing object name column 570. The object ID column 510 stores an object ID of an object to be moved (first electronic information). The history ID column 520 stores a history ID in the history ID column 410 of the corresponding history table 400. The object name column 530 stores the name of an object. The view column 540 stores a region of the screen on which the passing object (third electronic information) is displayed. The position column 550 stores the coordinates of the screen on which the passing object is displayed. The passing object ID column 560 stores an object ID of the passing object. The passing object name column 570 stores the object name of the passing object.

The operation-under-movement collection module 136 collects the operation of an operator during movement. For example, an operation of pressing a key set in advance in the keyboard during movement of the first electronic information corresponds to this collection operation. As the key set in advance, there is a key which displays the name of a folder at the position during the movement (position at which a mouse cursor or the like is present) if the key is pressed. In addition, there is also a key with a function of displaying a document name and the like stored in the folder.

The storage destination degree-of-association calculation module 140 is connected to the moving operation history processing module 130 and the storage destination degree-of-association storage module 150. The storage destination degree-of-association calculation module 140 calculates the degree of association between the first electronic information and the second electronic information and the degree of association between the first electronic information and the third electronic information on the basis of the information collected by the basic history collection module 132 and the trajectory collection module 134. As specific examples, there are the degree of association between a document (document to be moved) and a folder of a destination and the degree of association between a document (document to be moved) and a folder that the document has passed through during movement.

The degree of association between the first electronic information and the second electronic information may be calculated such that the maximum value is given as the degree of association. Since the first electronic information and the second electronic information are actually stored, the degree of association is set as a maximum value. In addition, the degree of association may also be calculated according to the time taken for the moving operation. The degree of association may be calculated so as to become higher as the time taken for the moving operation becomes shorter. In addition, the degree of association may also be calculated as a value obtained by dividing the time taken for the moving operation by the distance (may be the straight-line distance or may be the actual movement distance) from the source to the destination.

The degree of association between the first electronic information and the third electronic information is calculated so as to be a lower value than the degree of association between the first electronic information and the second electronic information.

In addition, the storage destination degree-of-association calculation module 140 may calculate the degree of association between the first electronic information and the third electronic information on the basis of the time taken for the first electronic information to pass through the third electronic information or the number of times by which the first electronic information has passed through the third electronic information. For example, the degree of association may be calculated so as to become higher as the time taken for the first electronic information to pass through the third electronic information becomes longer. This is because there is a high possibility that the operator will hesitate to store the first electronic information in the third electronic information. In addition, the degree of association may be calculated so as to become higher as the number of times by which the first electronic information has passed through the third electronic information increases. Similarly, this is because there is a high possibility that the operator will hesitate to store the first electronic information in the third electronic information.

In addition, the storage destination degree-of-association calculation module 140 may calculate the degree of association between the first electronic information and the third electronic information on the basis of the operation of the operator during movement collected by the operation-under-movement collection module 136. For example, a value set in advance may be added to the degree of association whenever the operation is performed.

In addition, the storage destination degree-of-association calculation module 140 may calculate the degree of association between the first electronic information and the third electronic information on the basis of the date and time of the operation collected by the basic history collection module 132. For example, the degree of association may be calculated so as to become higher as the date and time when the operation has been performed becomes closer to the present. In addition, the degree of association may be calculated again whenever a new moving operation is performed. For example, in the case where the time elapses from the time when the moving operation has been performed, the degree of association is calculated to be low.

Figure 6:
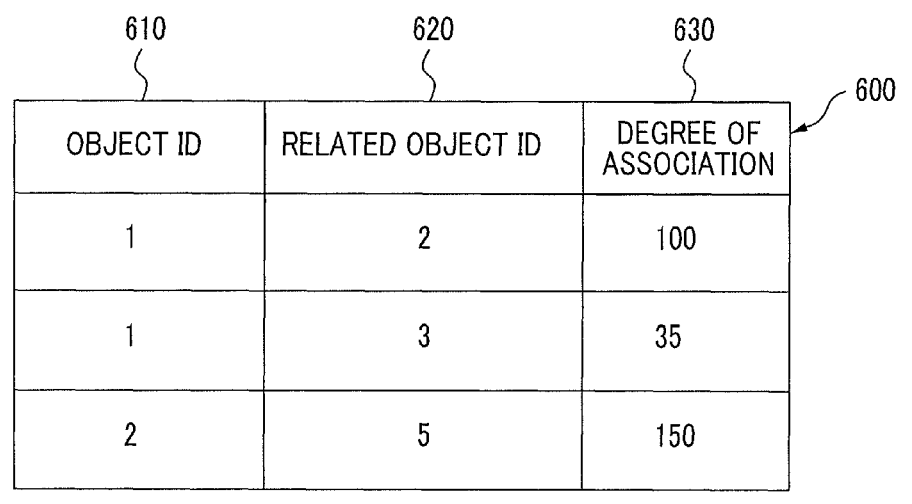

As a specific example, the storage destination degree-of-association calculation module 140 creates a storage destination degree-of-association table 600. FIG. 6 is an explanatory view showing an example of the data structure of the storage destination degree-of-association table 600. The storage destination degree-of-association table 600 has an object ID column 610, a related object ID column 620, and a degree-of-association column 630. The object ID column 610 stores an object ID of an object to be moved (first electronic information). The related object ID column 620 stores an object ID of an object (second electronic information) of the destination and an object ID of an object (third electronic information) that an object to be moved has passed through. The degree-of-association column 630 stores the degree of association between the first electronic information and the second electronic information and the degree of association between the first electronic information and the third electronic information calculated by the storage destination degree-of-association calculation module 140.

In addition, when the movement of the first electronic information detected by the moving operation detection module 120 is movement A, the storage destination degree-of-association calculation module 140 may eliminate the degree of association between the first electronic information and the electronic information of the source (for example, a folder in which the first electronic information is stored). The reason is that, since the first electronic information is associated with a folder or the like of the source in many cases, it may be interpreted that there is no relevance between the first electronic information and the source if the movement is movement A. "Eliminate" is to remove the relevance. Specifically, it is to delete the destination object ID column 422 of the history table 400 (may be the whole history table 400 of the history ID) and delete the related objects table 500 corresponding to the history ID.

In addition, when the movement of the first electronic information detected by the moving operation detection module 120 is movement B (copy), the storage destination degree-of-association calculation module 140 maintains the relevance between the first electronic information and the electronic information of the source (for example, a folder in which the first electronic information is stored) and performs processing in the configuration example (history collection) of the first exemplary embodiment illustrated in FIG. 1 or processing in the configuration example of the second exemplary embodiment illustrated in FIG. 12. Maintaining the relevance is that, when the first electronic information and the electronic information of the source are associated with each other, the information of the relevance is kept unchanged. When the first electronic information and the electronic information of the source are associated with each other, the electronic information of the source and the electronic information (second electronic information or third electronic information) of the destination may be associated with each other through the first document. In addition, two kinds of relevance of (1) first electronic information before movement and electronic information of a source are associated with each other and (2) first document (copied document of the first document) after movement and electronic information of a destination are associated with each other are also possible.

The storage destination degree-of-association storage module 150 is connected to the storage destination degree-of-association calculation module 140. The storage destination degree-of-association storage module 150 stores the first electronic information and the second electronic information associated with each other or the first electronic information and the third electronic information associated with each other on the basis of the degree of association calculated by the storage destination degree-of-association calculation module 140. Here, "On the basis of the degree of association" refers to determining whether or not there is relevance between two electronic information items (between the first electronic information and the second electronic information or between the first electronic information and the third electronic information) by comparing the degree of association calculated by the storage destination degree-of-association calculation module 140 with a threshold value set in advance. As a specific example, when the degree of association is equal to or greater than the threshold value or when the degree of association is greater than the threshold value, it is determined that there is relevance between both the electronic information items. For example, the storage destination degree-of-association storage module 150 stores the storage destination degree-of-association table 600.

Figure 2:
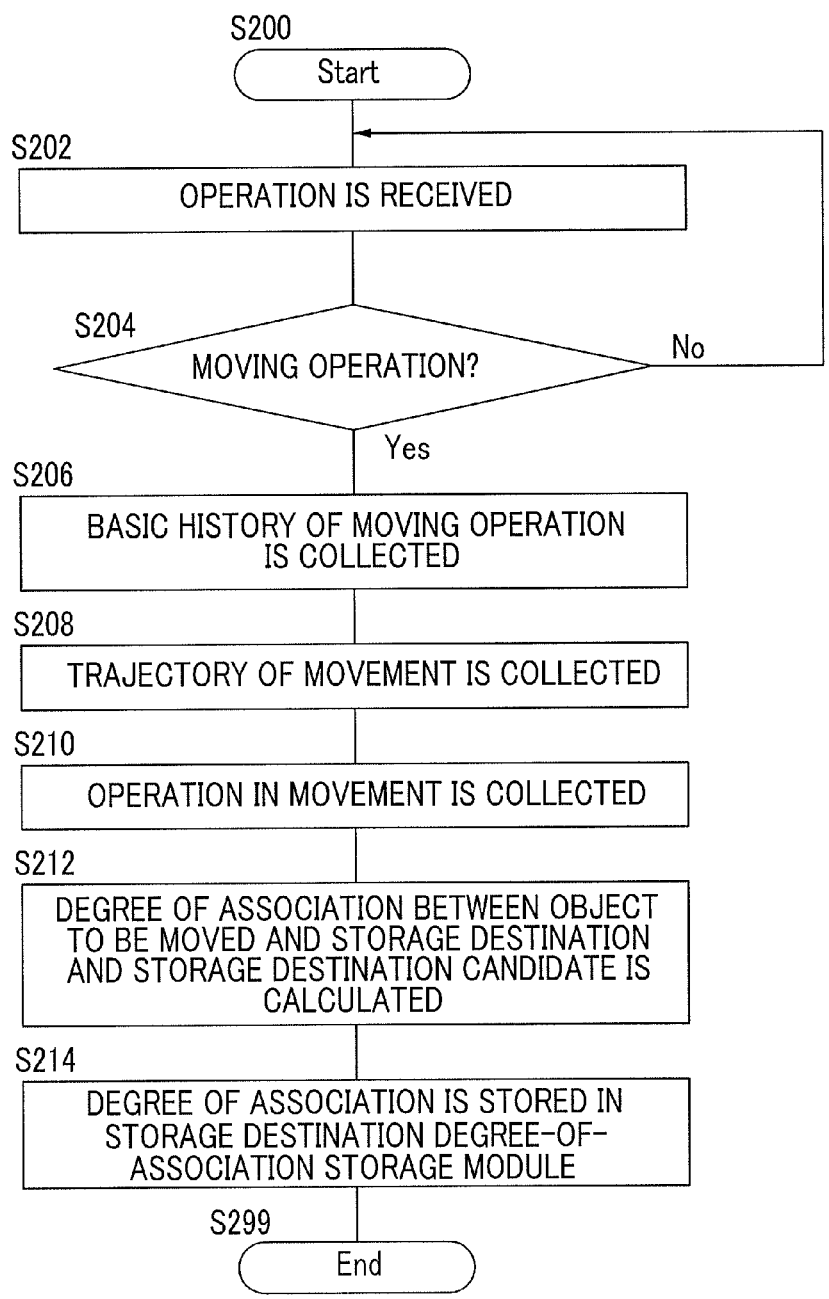
FIG. 2 is a flow chart showing an example of the process in the configuration example (history collection) of the first exemplary embodiment.

FIG. 2 is a flow chart showing an example of the process in the configuration example (history collection) of the first exemplary embodiment.

In step S202, the operation receiving module 110 receives an operation.

In step S204, the moving operation detection module 120 determines whether or not the operation is a moving operation. When the operation is a moving operation, the process proceeds to step S206. Otherwise, the process returns to step S202.

In step S206, the basic history collection module 132 collects a basic history of the moving operation. Here, basic history is the history table 400, for example.

In step S208, the trajectory collection module 134 collects the trajectory of movement.

In step S210, the operation-under-movement collection module 136 collects an operation in movement.

In step S212, the storage destination degree-of-association calculation module 140 calculates the degree of association between an object to be moved and a storage destination and a storage destination candidate. For example, the storage destination degree-of-association table 600 is created.

In step S214, the storage destination degree-of-association calculation module 140 stores the degree of association in the storage destination degree-of-association storage module 150.

Figure 7:
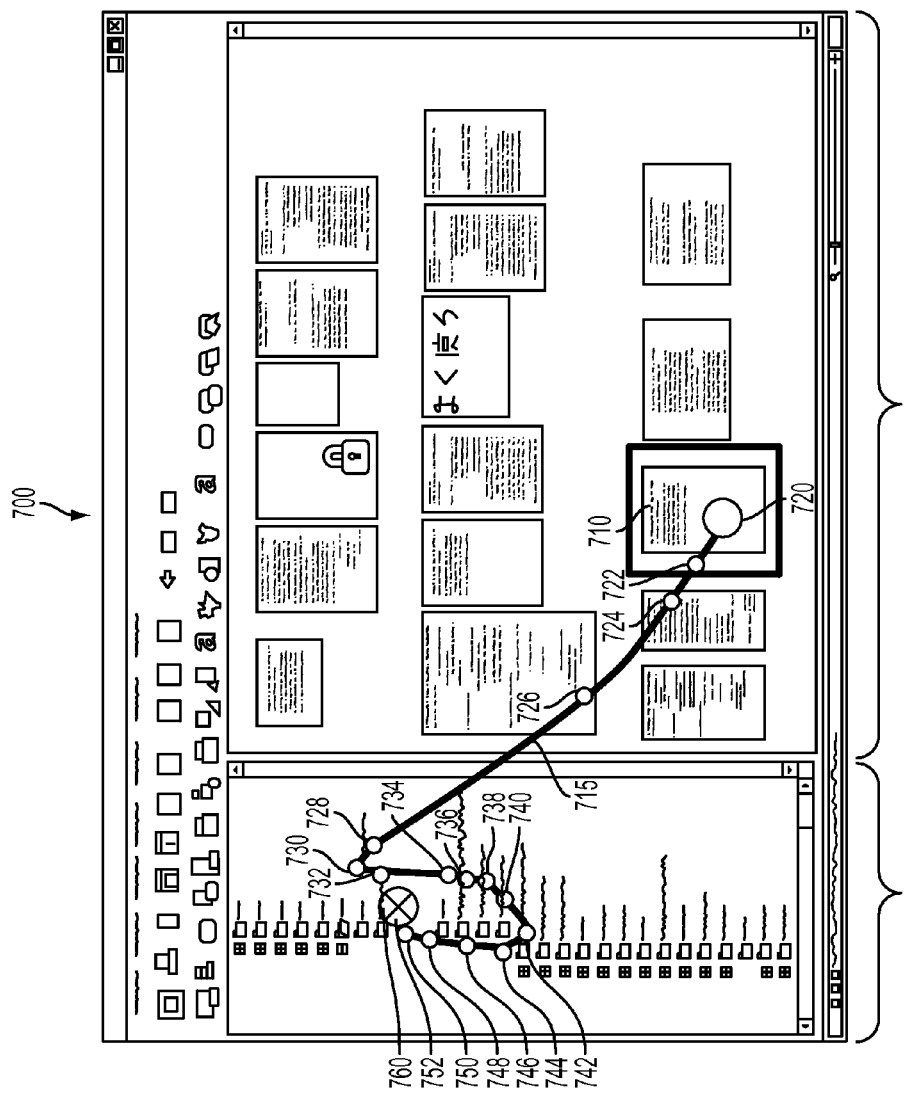
FIG. 7 is an explanatory view showing an example of the process in the configuration example (history collection) of the first exemplary embodiment.

FIG. 7 is an explanatory view showing an example of processing in the configuration example (history collection) of the first exemplary embodiment. A document arrangement screen 700 has the tree region 780 and the thumbnail region 790.

In an example shown in FIG. 7, an operation when storing a document to be moved 710 (first electronic information) in a storage destination folder 760 (second electronic information) is shown.

The document to be moved 710 in the thumbnail region 790 is selected and stored in the storage destination folder 760 within the tree region 780 along the trajectory 715.

In this case, the trajectory 715 is formed by the trajectory coordinates 720 to 752 collected at intervals set in advance. By the matching process between the trajectory coordinates 720 to 752 (may include the coordinates obtained by interpolation between the coordinates using the straight line and the curve shown by a function set in advance) and the object arrangement table 300, a folder (third electronic information) that the document to be moved 710 has passed through is detected. In addition, the storage destination degree-of-association calculation module 140 calculates the degree of association between the document to be moved 710 and the storage destination folder 760 and the degree of association between the document to be moved 710 and the passed folder (storage destination candidate).

Figure 8:
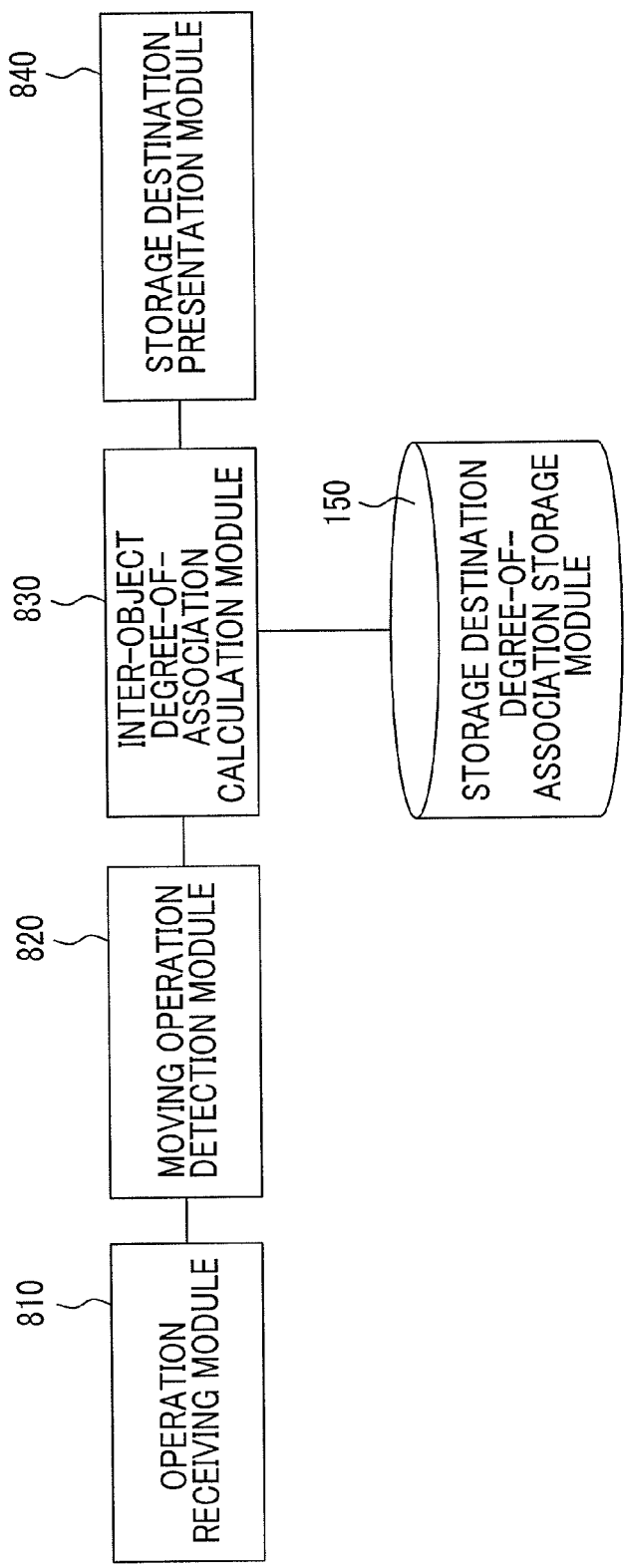
FIG. 8 is a view showing the conceptual module configuration in a configuration example (storage destination presentation) of the first exemplary embodiment.

FIG. 8 is a view illustrating the conceptual module configuration in the configuration example (storage destination presentation) of the first exemplary embodiment. The conceptual module configuration includes an operation receiving module 810, a moving operation detection module 820, an inter-object degree-of-association calculation module 830, a storage destination presentation module 840, and the storage destination degree-of-association storage module 150. In addition, the same components as in the configuration example (history collection) of the first exemplary embodiment are denoted by the same reference numerals, and repeated explanation thereof will be omitted. For example, in the configuration example (storage destination presentation) of the first exemplary embodiment, a folder or the like appropriate as a destination of a document or the like to be moved is presented using the storage destination degree-of-association table 600 in the storage destination degree-of-association storage module 150 created in the configuration example (history collection) of the first exemplary embodiment illustrated in FIG. 1. Specifically, a trajectory along which a document is dragged, a folder stopped during dragging, and a folder to which a document is dropped (in which a document is stored) are recorded when classifying documents in the past, and the candidate of a drop destination which is highly associated with the documents classified in the past is presented when classifying documents next, thereby assisting the classification.

In addition, the configuration example (storage destination presentation) of the first exemplary embodiment illustrated in FIG. 1 and the configuration example (storage destination presentation) of the first exemplary embodiment illustrated in FIG. 8 may be operated by the same operator or different operators. In addition, the storage destination degree-of-association storage module 150 may store results of operations of plural operators.

The operation receiving module 810 is connected to the moving operation detection module 820. The operation receiving module 810 is equivalent to the operation receiving module 110 illustrated in FIG. 1.

The moving operation detection module 820 is connected to the operation receiving module 810 and the inter-object degree-of-association calculation module 830. The moving operation detection module 820 is equivalent to the moving operation detection module 120 illustrated in FIG. 1.

The storage destination degree-of-association storage module 150 is connected to the inter-object degree-of-association calculation module 830.

The inter-object degree-of-association calculation module 830 is connected to the moving operation detection module 820, the storage destination presentation module 840, and the storage destination degree-of-association storage module 150. The inter-object degree-of-association calculation module 830 calculates the degree of association between the fourth electronic information, which is electronic information to be moved, and the first electronic information, which is stored in the storage destination degree-of-association storage module 150, from the operation detected by the moving operation detection module 820. The degree of association herein is a degree of association between the fourth electronic information and the first electronic information. As a specific example, the degree of association herein is a degree of association between a document (document to be moved at present) and a document (document moved in the past). For example, the degree of association may be calculated from the number of matched character information items included in both documents, the rate of the number of matched character information items in documents, and the like. In addition, the degree of association is calculated from the degree of matching of images included in both documents, the degree of matching of layout information of both documents, the degree of matching of attribution information given to both documents, the degree of matching of the shapes of the trajectories when movement occurs, folder information of a folder in which the document is stored (attribution information, the number of documents stored in the folder, and the like), and the like. For example, the degree of association is calculated by substituting the number of matches and the like described above into the expression having these as variables. As the expression having the number of matches and the like as variables, it is possible to use an expression which calculates the values of the variables themselves as the degree of association or an expression which multiplies the variables by the values set in advance.

Figure 10:
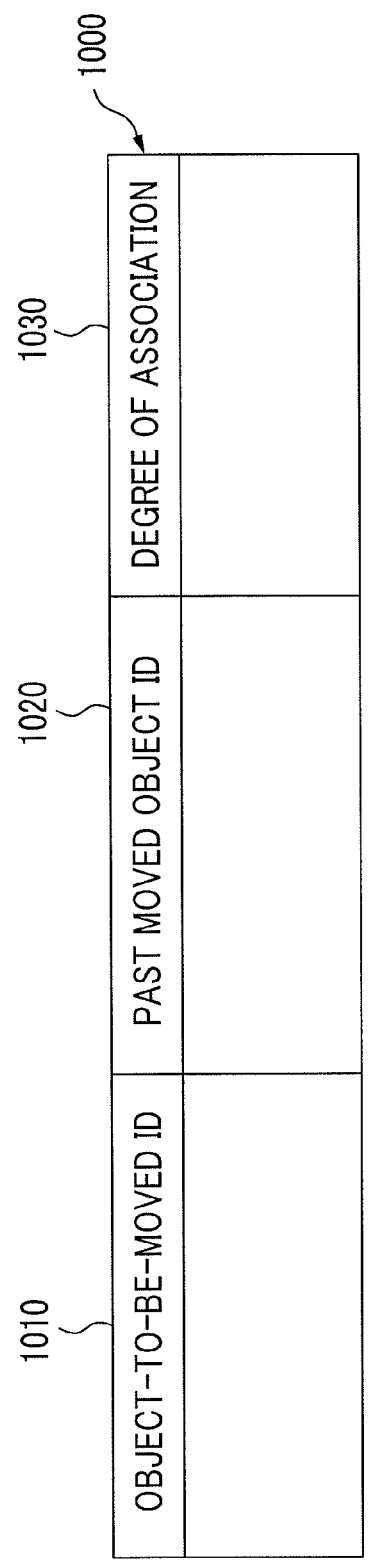
FIG. 10 is an explanatory view showing an example of the data structure of a table of a degree of association between objects to be moved.

The inter-object degree-of-association calculation module 830 creates a table of a degree of association between objects to be moved 1000, for example. FIG. 10 is an explanatory view showing an example of the data structure of the table of a degree of association between objects to be moved 1000. The table of a degree of association between objects to be moved 1000 has an object-to-be-moved ID column 1010, a past moved object ID column 1020, and a degree-of-association column 1030. The object-to-be-moved ID column 1010 stores an object ID of an object to be moved at present (fourth electronic information). The past moved object ID column 1020 stores an object ID of an object moved in the past (first electronic information). The degree-of-association column 1030 stores the degree of association between the first electronic information and the fourth electronic information calculated by the inter-object degree-of-association calculation module 830.

Figure 11:
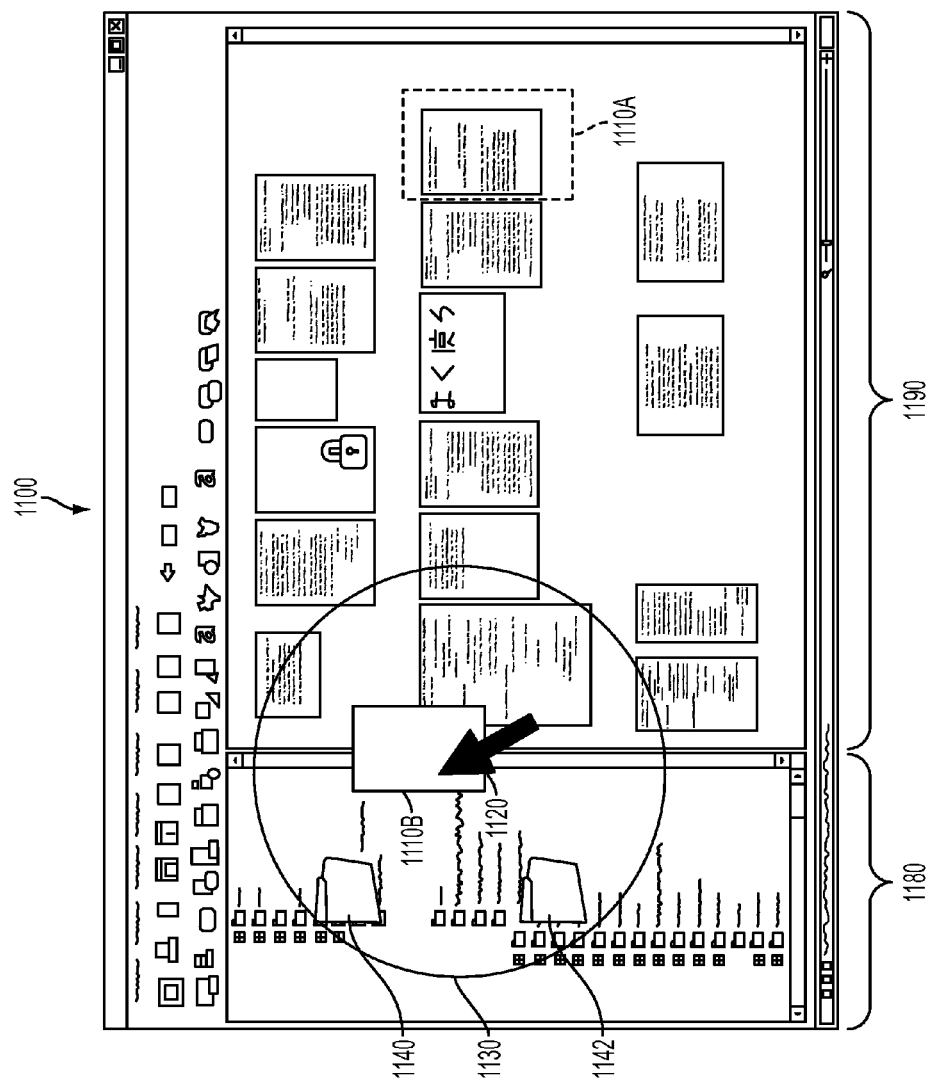
FIG. 11 is an explanatory view showing an example of the process in the configuration example (storage destination presentation) of the first exemplary embodiment.

The storage destination presentation module 840 is connected to the inter-object degree-of-association calculation module 830. On the basis of the degree of association between the first electronic information and the fourth electronic information calculated by the inter-object degree-of-association calculation module 830, the storage destination presentation module 840 presents the second electronic information or the third electronic information stored in the first electronic information, as a destination of the fourth electronic information, in a different form from other electronic information disposed on the screen. Here, "on the basis of the degree of association" refers to determining whether or not there is relevance between the first electronic information and the fourth electronic information by comparing the degree of association calculated by the inter-object degree-of-association calculation module 830 with a threshold value set in advance. Specifically, when the degree of association between the document to be moved at present and the document moved in the past is equal to or greater than the threshold value or when the degree of association is greater than the threshold value, it is determined that there is relevance between both the documents. In addition, specifically, the "second electronic information or the third electronic information in which the first electronic information is stored" is preferably extracted from the destination object ID column 422 of the history table 400 and the passing object ID column 560 of the related objects table 500. In addition, "other electronic information" is electronic information (folder and the like) other than the second electronic information or the third electronic information. These are presented in a typical form (form presented in a state where the process of the present exemplary embodiment is not performed) on a screen. As the "different form", it is preferable to change color, shape (including the size and the like), pattern, and combinations thereof as long as these are different from the typical form. For example, storage destination presentation folders 1140 and 1142 shown in FIG. 11 are presented largely.

In addition, the storage destination presentation module 840 may present the second electronic information or the third electronic information, in which the first electronic information is stored and which is located a predetermined distance from the position of the fourth electronic information under movement, in a different form from other electronic information disposed on the screen. For example, in order to improve the efficiency in computation of a candidate of a drop destination, the degree of association is calculated for the classification to which a mouse cursor is approaching.

In addition, the storage destination presentation module 840 may change the form according to the degree of association. For example, when the degree of association is high, it is possible to present a larger icon than that when the degree of association is low.

Figure 9:
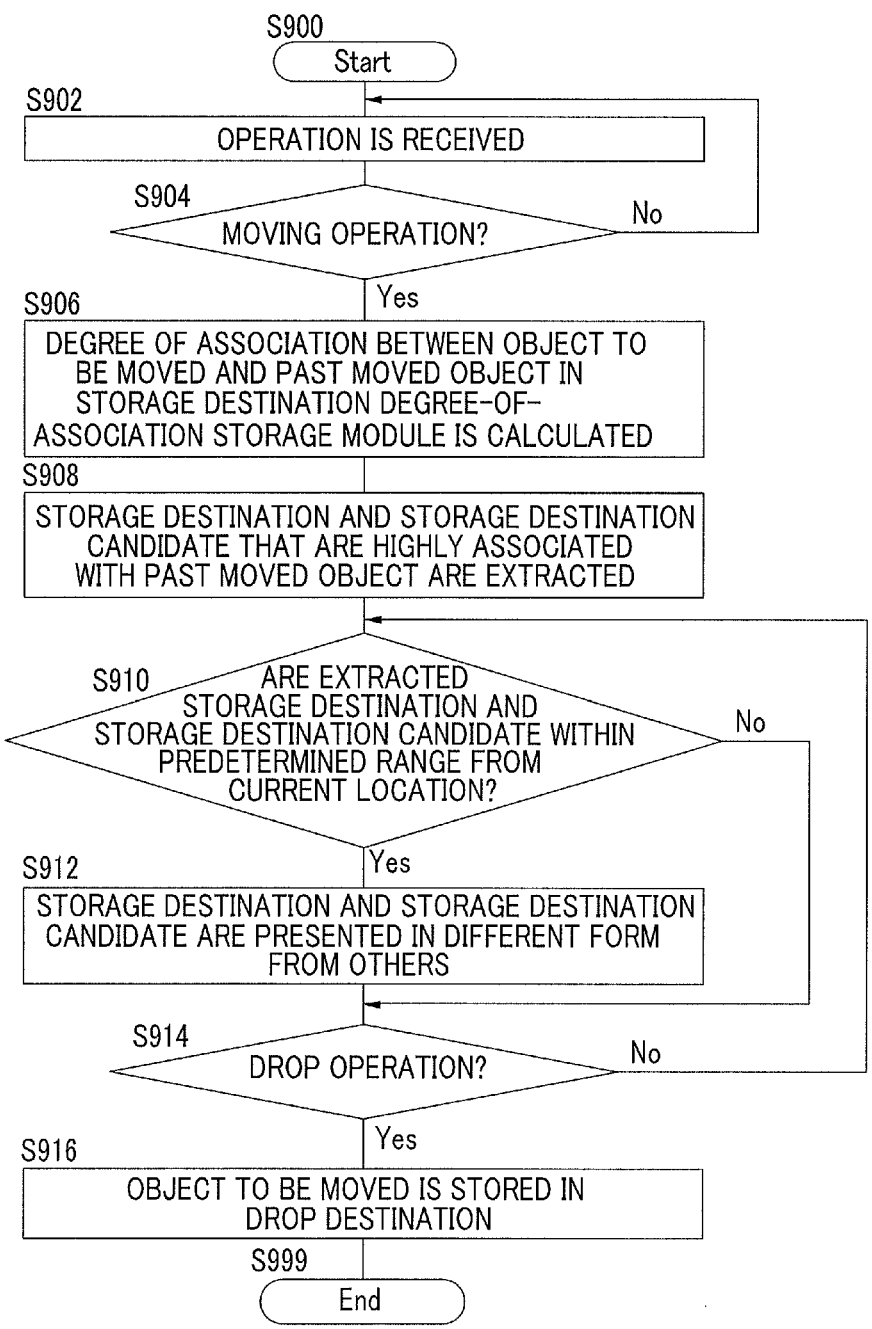
FIG. 9 is a flow chart showing an example of the process in the configuration example (storage destination presentation) of the first exemplary embodiment.

FIG. 9 is a flow chart showing an example of the process in the configuration example (storage destination presentation) of the first exemplary embodiment.

In step S902, the operation receiving module 810 receives an operation.

In step S904, the moving operation detection module 820 determines whether or not the operation is a moving operation. When the operation is a moving operation, the process proceeds to step S906. Otherwise, the process returns to step S902.

In step S906, the inter-object degree-of-association calculation module 830 calculates the degree of association between an object to be moved and a past moved object in the storage destination degree-of-association storage module 150.

In step S908, the inter-object degree-of-association calculation module 830 extracts a storage destination (second electronic information) and a storage destination candidate (third electronic information) which are highly associated with the past moved object.

In step S910, the storage destination presentation module 840 determines whether or not the extracted storage destination and storage destination candidate are within a predetermined range from the current location. When the extracted storage destination and storage destination candidate are within the predetermined range from the current location, the process proceeds to step S912. Otherwise, the process proceeds to step S914.

In step S912, the storage destination presentation module 840 presents the storage destination and the storage destination candidate in a different form from the others.

In step S914, the storage destination presentation module 840 determines whether or not the operation is a drop operation. When the operation is a drop operation, the process proceeds to step S916. Otherwise, the process returns to step S910.

In step S916, the object to be moved is stored in the drop destination.

FIG. 11 is an explanatory view showing an example of processing in the configuration example (storage destination presentation) of the first exemplary embodiment. A document arrangement screen 1100 has a tree region 1180 and a thumbnail region 1190.

In the example shown in FIG. 11, a screen when a document to be moved (before movement) 1110A (fourth electronic information) is moved to the position (document to be moved (under movement) 1110B) of a cursor 1120 is presented. The storage destination presentation folders 1140 and 1142 in a search range 1130 which is within a predetermined distance from the cursor 1120 are folders in which documents, which are highly associated with the document to be moved (before movement) 1110A, are stored or folders that the documents have passed through until the documents are stored. The storage destination presentation folders 1140 and 1142 are presented so as to be larger than other folders. In addition, although only the electronic information in the search range 1130 is set as objects, it is also possible to select the document to be moved (before movement) 1110A and present the document to be moved by changing the form like the storage destination presentation folders 1140 and 1142 if dragging starts (that is, a limitation called a folder in the search range 1130 is not set).

FIG. 12 is a view showing the conceptual module configuration in a configuration example of a second exemplary embodiment. In the second exemplary embodiment, the configuration example (history collection) of the first exemplary embodiment illustrated in FIG. 1 and the configuration example (storage destination presentation) of the first exemplary embodiment illustrated in FIG. 8 are combined. In addition, in the second exemplary embodiment, when the processing of the inter-object degree-of-association calculation module 830 and the storage destination presentation module 840 is performed, the processing of the moving operation history processing module 130 and the storage destination degree-of-association calculation module 140 is performed. That is, not only is the presentation processing, such as the configuration example (storage destination presentation) of the first exemplary embodiment illustrated in FIG. 8, performed, but also the moving processing becomes basic data in the subsequent processing.

The conceptual module configuration includes an operation receiving module 110, a moving operation detection module 120, a moving operation history processing module 130, a storage destination degree-of-association calculation module 140, a storage destination degree-of-association storage module 150, an inter-object degree-of-association calculation module 830, and a storage destination presentation module 840. Moreover, the same components as in the first exemplary embodiment are denoted by the same reference numerals, and repeated explanation thereof will be omitted. The moving operation detection module 120 is connected to the operation receiving module 110, the moving operation history processing module 130, and the inter-object degree-of-association calculation module 830.

The storage destination degree-of-association storage module 150 is connected to the storage destination degree-of-association calculation module 140 and the inter-object degree-of-association calculation module 830.

The inter-object degree-of-association calculation module 830 is connected to the moving operation detection module 120, the storage destination presentation module 840, and the storage destination degree-of-association storage module 150.

FIG. 13 is a flow chart showing an example of the process in the configuration example of the second exemplary embodiment.

In step S1302, the operation receiving module 110 receives an operation.

In step S1304, the moving operation detection module 120 determines whether or not the operation is a moving operation. When the operation is a moving operation, the process proceeds to step S1306. Otherwise, the process returns to step S1302.

In step S1306, the inter-object degree-of-association calculation module 830 calculates the degree of association between an object to be moved and a past moved object in the storage destination degree-of-association storage module 150.

In step S1308, the inter-object degree-of-association calculation module 830 extracts a storage destination and a storage destination candidate which are highly associated with the past moved object.

In step S1310, the storage destination presentation module 840 determines whether or not the extracted storage destination and storage destination candidate are within a predetermined range from the current location. When the extracted storage destination and storage destination candidate are within the predetermined range from the current location, the process proceeds to step S1312. Otherwise, the process proceeds to step S1314.

In step S1312, the storage destination presentation module 840 presents the storage destination and the storage destination candidate in a different form from the others.

In step S1314, the storage destination presentation module 840 determines whether or not the operation is a drop operation. When the operation is a drop operation, the process proceeds to step S1316. Otherwise, the process returns to step S1310.

In step S1316, the object to be moved is stored in the drop destination.

In step S1318, the basic history collection module 132 collects a basic history of the moving operation.

In step S1320, the trajectory collection module 134 collects the trajectory of movement.

In step S1322, the operation-under-movement collection module 136 collects an operation in movement.

In step S1324, the storage destination degree-of-association calculation module 140 calculates the degree of association between an object to be moved and a storage destination and a storage destination candidate.

In step S1326, the storage destination degree-of-association calculation module 140 stores the degree of association in the storage destination degree-of-association storage module 150.

Figure 14:
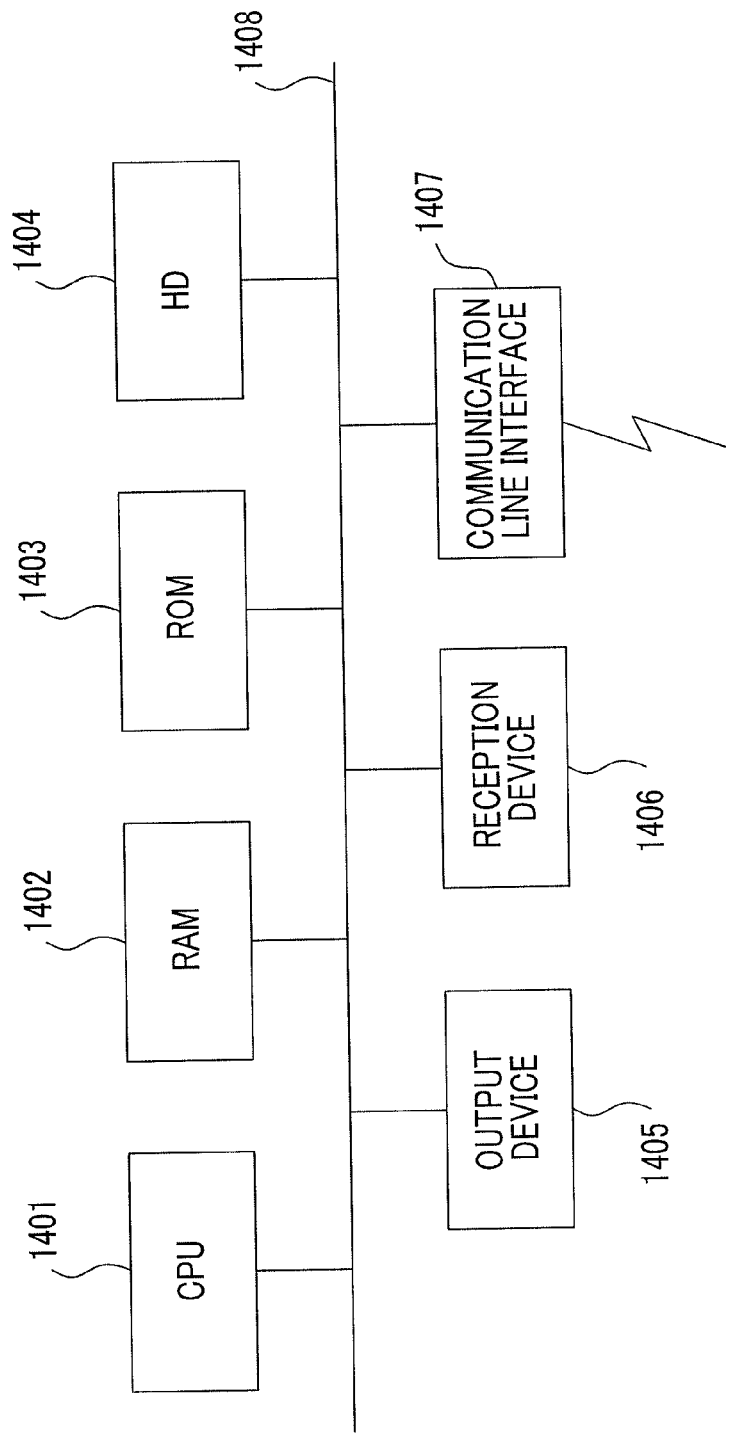
FIG. 14 is a block diagram showing an example of the hardware configuration of a computer for realizing the present exemplary embodiment.

In addition, as illustrated in FIG. 14, the hardware configuration of a computer executed by a program as the present exemplary embodiment is the same as that of a typical computer. Specifically, the computer executed by the program as the present exemplary embodiment is a personal computer, a computer that may serve as a server, and the like. That is, as a specific example, a CPU 1401 is used as a processing unit (operation unit) and a RAM 1402, a ROM 1403, and an HD 1404 are used as storage devices. A hard disk may, for example, be used as the HD 1404. The hardware configuration of a computer executed by a program as the present exemplary embodiment includes: the CPU 1401 that executes programs of modules, such as the operation receiving module 110, the moving operation detection module 120, the moving operation history processing module 130, the basic history collection module 132, the trajectory collection module 134, the operation-under-movement collection module 136, the storage destination degree-of-association calculation module 140, the operation receiving module 810, the moving operation detection module 820, the inter-object degree-of-association calculation module 830, and the storage destination presentation module 840; the RAM 1402 in which the programs or the data is stored; the ROM 1403 in which a program used to start the computer and the like are stored; the HD 1404 which is an auxiliary storage device; a reception device 1406 which receives the data on the basis of a user's operation on a keyboard, a mouse, a touch panel, and the like; an output device 1405, such as a CRT or a liquid crystal display; a communication line interface 1407 used for connection with a communication network, such as a network interface card; and a bus 1408 which connects these components to each other so that the data is exchangeable. Plural computers may be connected to each other through a network.

In the case of the exemplary embodiment based on a computer program, the exemplary embodiment is realized by reading the computer program, which is software, into a system with the above-described hardware configuration and making the software and hardware resources cooperate with each other.

In addition, the hardware configuration shown in FIG. 14 is just an example of the configuration. The present exemplary embodiment is not limited to the configuration shown in FIG. 14, and may be a configuration in which the modules described in the present exemplary embodiment are executable. For example, some of the modules may be configured using dedicated hardware (for example, ASIC), or some of the modules may be provided in an external system so as to be connected to each other through a communication line. In addition, plural systems shown in FIG. 14 may be connected to each other through a communication line so as to operate cooperatively. In particular, in addition to the personal computer, the modules may be included in information appliances, a copying machine, a facsimile, a scanner, a printer, a complex machine (image processing apparatus having two or more functions of a scanner, a printer, a copying machine, and a facsimile), and the like.

In addition, the program described above may be provided in a state where the program is stored on a recording medium or the program may be provided through a communication unit. In this case, the program may be regarded as the invention of a "computer readable recording medium on which a program is recorded", for example.

The "computer readable recording medium on which a program is recorded" refers to a recording medium having a program recorded thereon and readable by a computer which is used for installation, execution, distribution, and the like of the program.

In addition, examples of recording media include: in association with a digital versatile disc (DVD), 'DVD-R, DVD-RW, DVD-RAM, and the like' that are standards established by a DVD forum and 'DVD+R, DVD+RW, and the like' that are standards established by a DVD+RW forum; in association with a compact disc (CD), a compact disc read only memory (CD-ROM), a CD-Recordable (CD-R), and a CD-Rewritable (CD-RW), and the like; a Blu-ray disc (registered trademark); a magneto-optical disc (MO); a flexible disk (FD); a magnetic tape; a hard disk; a read only memory (ROM); an electrically erasable and programmable read only memory (EEPROM (registered trademark)); a flash memory; a random access memory (RAM); and a Secure Digital (SD) memory card.

In addition, the program or a part of the program may be stored or distributed in a state where the program or the part of the program is recorded on the recording media. In addition, the program may be transmitted by communication, for example, through a wired network such as a local area network (LAN), a metropolitan area network (MAN), a wide area network (WAN), the Internet, an intranet, and an extranet or through a wireless communication network. Alternatively, the program may be transmitted through a transmission medium obtained by combination of those described above or may be carried by a carrier.

In addition, the program may be apart of another program or may be recorded on a recording medium together with a separate program. In addition, the program may be divided and recorded on plural recording media. In addition, the program may be recorded in any kind of format including compression, encryption, and the like as long as it is possible to restore the program.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. An information processing apparatus comprising:
a reception unit that receives an operation of an operator for electronic information disposed on a screen;
a detection unit that detects a moving operation related to movement of electronic information from the operation received by the reception unit;
a first collection unit that collects a position of a source, a position of a destination, a position of a trajectory during movement, first electronic information that is electronic information to be moved, and second electronic information that is electronic information of the destination, on the basis of the moving operation detected by the detection unit;
a second collection unit that collects third electronic information, which is electronic information that the first electronic information has passed through, on the basis of the position of the trajectory during movement collected by the first collection unit;
a first calculation unit that calculates a degree of association between the first electronic information and the second electronic information and a degree of association between the first electronic information and the third electronic information on the basis of the information collected by the first and second collection units;
a memory that stores the first electronic information and the second electronic information associated with each other or the first electronic information and the third electronic information associated with each other on the basis of the degree of association calculated by the first calculation unit;
a second calculation unit that calculates a degree of association between fourth electronic information, which is electronic information to be moved, and the first electronic information, which is stored in the memory, from the operation detected by the detection unit; and
a presentation unit that presents the second electronic information or the third electronic information in which the first electronic information is stored, as a destination of the fourth electronic information, in a different form from other electronic information disposed on the screen on the basis of the degree of association between the first electronic information and the fourth electronic information calculated by the second calculation unit, wherein the first calculation unit calculates the degree of association between the first electronic information and the third electronic information on the basis of time taken for the first electronic information to pass through the third electronic information or the number of times by which the first electronic information has passed through the third electronic information.

2. The information processing apparatus according to claim 1, wherein in response to the degree of association between the first electronic information and the second electronic information, or the degree of association between the first electronic information and the third electronic information is high, the presentation unit presents a larger icon to represent the second electronic information or the third electronic information than that when the degree of association is low.

3. An information processing apparatus comprising:

a reception unit that receives an operation of an operator for electronic information disposed on a screen;

a detection unit that detects a moving operation related to movement of electronic information from the operation received by the reception unit;

a first collection unit that collects a position of a source, a position of a destination, a position of a trajectory during movement, first electronic information that is electronic information to be moved, and second electronic information that is electronic information of the destination, on the basis of the moving operation detected by the detection unit;

a second collection unit that collects third electronic information, which is electronic information that the first electronic information has passed through, on the basis of the position of the trajectory during movement collected by the first collection unit;

a calculation unit that calculates a degree of association between the first electronic information and the second electronic information and a degree of association between the first electronic information and the third electronic information on the basis of the information collected by the first and second collection units; and a memory that stores the first electronic information and the second electronic information associated with each other or the first electronic information and the third electronic information associated with each other on the basis of the degree of association calculated by the calculation unit, wherein the calculation unit calculates the degree of association between the first electronic information and the third electronic information on the basis of time taken for the first electronic information to pass through the third electronic information or the number of times by which the first electronic information has passed through the third electronic information.

4. The information processing apparatus according to claim 3, wherein the first collection unit collects an operation of the operator during movement, and the calculation unit calculates the degree of association between the first electronic information and the third electronic information on the basis of the operation of the operator during movement collected by the first collection unit, wherein the operation is an operation different than selecting and moving the electronic information.

5. The information processing apparatus according to claim 4, wherein the first collection unit collects date and time of a moving operation related to movement, and the calculation unit calculates the degree of association between the first electronic information and the third electronic information on the basis of the date and time of the operation collected by the first collection unit.

6. The information processing apparatus according to claim 3, wherein the first collection unit collects date and time of a moving operation related to movement, and the calculation unit calculates the degree of association between the first electronic information and the third electronic information on the basis of the date and time of the operation collected by the first collection unit.

7. The information processing apparatus according to claim 3 comprising:

a reception unit that receives an operation of an operator for electronic information disposed on a screen;

a detection unit that detects a moving operation related to movement of electronic information from the operation received by the reception unit;

a calculation unit that calculates a degree of association between fourth electronic information, which is electronic information to be moved, and the first electronic information stored in the memory, from the operation detected by the detection unit; and a presentation unit that presents second electronic information or third electronic information in which the first electronic information is stored, as a destination of the fourth electronic information, in a different form from other electronic information disposed on the screen, on the basis of the degree of association between the first electronic information and the fourth electronic information calculated by the calculation unit.

8. The information processing apparatus according to claim 7, wherein the presentation unit presents the second electronic information or the third electronic information, in which the first electronic information is stored and which is within a predetermined distance from a position of the fourth electronic information during movement, in a different form from other electronic information disposed on the screen.

9. The information processing apparatus according to claim 7, wherein in response to the degree of association between the first electronic information and the second electronic information, or the degree of association between the first electronic information and the third electronic information is high, the presentation unit presents a larger icon to represent the second electronic information or the third electronic information than that when the degree of association is low.

10. A non-transitory computer readable medium storing an information processing program causing a computer to function as:

a reception unit that receives an operation of an operator for electronic information disposed on a screen;

a detection unit that detects a moving operation related to movement of electronic information from the operation received by the reception unit;

a first collection unit that collects a position of a source, a position of a destination, a position of a trajectory during movement, first electronic information that is electronic information to be moved, and second electronic information that is electronic information of the destination, on the basis of the moving operation detected by the detection unit;

a second collection unit that collects third electronic information, which is electronic information that the first electronic information has passed through, on the basis of the position of the trajectory during movement collected by the first collection unit;

a first calculation unit that calculates a degree of association between the first electronic information and the second electronic information and a degree of association between the first electronic information and the third electronic information on the basis of the information collected by the first and second collection units;

a memory that stores the first electronic information and the second electronic information associated with each other or the first electronic information and the third electronic information associated with each other on the basis of the degree of association calculated by the first calculation unit;

a second calculation unit that calculates a degree of association between fourth electronic information, which is electronic information to be moved, and the first electronic information, which is stored in the memory, from the operation detected by the detection unit; and a presentation unit that presents the second electronic information or the third electronic information in which the first electronic information is stored, as a destination of the fourth electronic information, in a different form from other electronic information disposed on the screen on the basis of the degree of association between the first electronic information and the fourth electronic information calculated by the second calculation unit, wherein the calculation unit calculates the degree of association between the first electronic information and the third electronic information on the basis of time taken for the first electronic information to pass through the third electronic information or the number of times by which the first electronic information has passed through the third electronic information.

11. A non-transitory computer readable medium storing an information processing program causing a computer to function as:

a reception unit that receives an operation of an operator for electronic information disposed on a screen;

a detection unit that detects a moving operation related to movement of electronic information from the operation received by the reception unit;

a first collection unit that collects a position of a source, a position of a destination, a position of a trajectory during movement, first electronic information that is electronic information to be moved, and second electronic information that is electronic information of the destination, on the basis of the moving operation detected by the detection unit;

a second collection unit that collects third electronic information, which is electronic information that the first electronic information has passed through, on the basis of the position of the trajectory during movement collected by the first collection unit;

a calculation unit that calculates a degree of association between the first electronic information and the second electronic information and a degree of association between the first electronic information and the third electronic information on the basis of the information collected by the first and second collection units; and a memory that stores the first electronic information and the second electronic information associated with each other or the first electronic information and the third electronic information associated with each other on the basis of the degree of association calculated by the calculation unit, wherein the calculation unit calculates the degree of association between the first electronic information and the third electronic information on the basis of time taken for the first electronic information to pass through the third electronic information or the number of times by which the first electronic information has passed through the third electronic information.

12. An information processing method comprising:

receiving an operation of an operator for electronic information disposed on a screen;

detecting a moving operation related to movement of electronic information from the received operation;

collecting a position of a source, a position of a destination, a position of a trajectory during movement, first electronic information that is electronic information to be moved, and second electronic information that is electronic information of the destination, on the basis of the detected moving operation;

collecting third electronic information, which is electronic information that the first electronic information has passed through, on the basis of the collected position of the trajectory during movement;

calculating a degree of association between the first electronic information and the second electronic information and a degree of association between the first electronic information and the third electronic information on the basis of the collected information;

storing the first electronic information and the second electronic information associated with each other or the first electronic information and the third electronic information associated with each other on the basis of the calculated degree of association;

calculating a degree of association between fourth electronic information, which is electronic information to be moved, and the first electronic information, which is stored in the memory, from the detected operation; and presenting the second electronic information or the third electronic information in which the first electronic information is stored, as a destination of the fourth electronic information, in a different form from other electronic information disposed on the screen on the basis of the calculated degree of association between the first electronic information and the fourth electronic information, wherein the calculating of the degree of association between the first electronic information and the third electronic information is calculated on the basis of time taken for the first electronic information to pass through the third electronic information or the number of times by which the first electronic information has passed through the third electronic information.

13. The information processing method according to claim 12, wherein in response to the degree of association between the first electronic information and the second electronic information, or the degree of association between the first electronic information and the third electronic information is high, the presentation unit presents a larger icon to represent the second electronic information or the third electronic information than that when the degree of association is low.

* * * * *